United States Patent [19]

Himmelman

[11] 3,914,367
[45] Oct. 21, 1975

[54] METHOD OF FORMING INFLATION BLADDER AND ELIMINATING TRAPPED GAS FROM A MOLDED BLADDER SEAM

[75] Inventor: Larry David Himmelman, Dartmouth, Canada

[73] Assignee: Town Tire Services Limited, Canada

[22] Filed: Apr. 8, 1974

[21] Appl. No.: 459,094

[30] Foreign Application Priority Data
Feb. 15, 1974 Canada .................................. 192604

[52] U.S. Cl. ................ 264/219; 264/236; 264/248; 264/326; 264/331; 264/347
[51] Int. Cl.[2] ........................ B29H 5/01; B29H 7/03
[58] Field of Search ........... 264/219, 248, 326, 314, 264/315, 236, 347; 425/403, 812

[56] References Cited
UNITED STATES PATENTS
1,190,731    7/1916    Crawford ............................ 425/813

Primary Examiner—Robert F. White
Assistant Examiner—Willard E. Hoag
Attorney, Agent, or Firm—Stevens, Davis, Miller & Mosher

[57] ABSTRACT

A method are described for making an inflatable bladder of a vulcanizable elastomeric material. Such a bladder is used, for example, in the retreading of tires. A pair of disc-like sheets of the elastomeric material normally are positioned on opposite sides of an inner mandrel. These sheets and the mandrel are generally circular in plan, and the sheets have peripheral edges which abut one another. The inner mandrel has a main body section with a peripheral portion having a channel extending circumferentially. The abutting edges of the sheets are placed in this channel so that during vulcanization, the material fills substantially all of the channel and forms a reinforced joint having a seamless outer face. The circumferentially extending channel includes a series of blind apertures normally extending radially into the main body section of the mandrel. These apertures are spaced evenly apart around the periphery and serve as pockets or reservoirs for interstitial air which otherwise would be trapped in the channel and/or elastomeric material being vulcanized. The blind apertures within the groove preferably are spaced every 2 inches along the circumference, and have a diameter of one-eighth inch drilled to approximately three-quarter inches deep. The mandrel is commonly segmented being made up of a plurality of interconnectable segments, and is used in a conventional mould.

2 Claims, 2 Drawing Figures

METHOD OF FORMING INFLATION BLADDER AND ELIMINATING TRAPPED GAS FROM A MOLDED BLADDER SEAM

This invention relates to a method for producing an inflatable bladder. More particularly, the method described herein provides for the manufacture of an improved inflatable bladder by using a specifically configured inner mandrel that provides a reinforced joint having a seamless exterior surface on the circumference of the bladder.

BACKGROUND OF THE INVENTION

The procedures and apparatus normally used in the retreading of worn tires will be known to those knowledgable in this art. Briefly, however, it is customary to inflate the interior of a tire casing in order to press that casing uniformly against a tread band or tread forming mould. Inflation of the interior of the tire casing can be done either with a standard inner tube, use of the tubeless bead seal, or the use of an inflatable bladder specifically designed for this purpose.

Such a bladder is similar in construction to an inner tube, except that it has had the radially inwardly facing ring of the donut shape removed. The compression air seal in the retreading process is achieved by capping the peripheral edges on the inside of a circular bladder ring.

Prior art inflatable bladders have generally been formed by placing two large rubber sheets onto either sides of an inner mandrel. These sheets were cut into washer-like shapes. These sheets and the inner mandrel on which they were placed are then enclosed within an outer, split mould. Heat and pressure were provided generally by steam or other hot gaseous medium to vulcanize the rubber sheets. Under the effect of the heat and pressure the rubber around the outer edges of the two sheets will bond together and form a circumferential joint. The two sheets when so joined together around their circumference constitute the bladder.

One of the problems frequently encountered with prior art bladders has been the tendency for that circumferential joint to become unsealed, or separated prematurely under the effects of heat and pressure of vulcanization in a retreading operation. Attempts have been made to provide a reinforced joint, such as by increasing the thickness of material in the region of that circumferential joint. One technique for providing such a thicked joint is described in U.S. Pat. No. 1,317,442 which issued Sept. 30, 1919 to R. Griffith. That patentee was concerned with the manufacture of a hot water bottle or the like, and was particularly concerned with providing a reinforced joint at the location were the side walls of the bag were vulcanized together. It was then proposed that the exterior portion of the mould with which this operation was conducted should include a groove into which there would flow an excess of the rubber being vulcanized, tending to thicken and strengthen the sides of the bag at that point. Such an operation is unacceptable in making inflatable bladders or retreading tires, since the joint formed has a sizeable external bead on it. Moreover, because that operation was useful for making hot water bottles that did not have to withstand substantial amounts of heat and pressure, little concern was paid to the problem of eliminating interstitial air from the sheets of elastomeric material being bonded together.

Studies and developments in the art of retreading tires has, over the years, demonstrated that the unwanted retention of interstitial air within the plies of the tire casing and/or in replacement tread band during the vulcanizing operation are major contributors to the premature failure of the tire, for instance, by separation of the tread band from the tire carcass. See Canadian Pat. No. 565,909 which issued Nov. 11, 1958 to the Goodyear Tire and Rubber Company; or Canadian Pat. No. 848,858 which issued Aug. 11, 1970 to Uniroyal Limited as examples of the continuing need to improve upon the techniques for eliminating that interstitial air. Although these two latter patents are concerned with venting of tire moulds, the basic problems there encountered are similar to those arising in the production of an inflatable bladder which may be used in the production and retreading of tires.

SUMMARY OF THE INVENTION

The process to be described below will avoid and substantially eliminate many of the problems associated with the production of an inflatable bladder according to techniques used previously. It has been recognized herein, for instance, that providing an inner mandrel with a groove or channel cut into the circumferential face of that mandrel will enable a thickened joint to be formed, while ensuring the formation of a good bond. Even more importantly, I have recognized that providing such a channel on the inner mandrel will accomodate the formation of a reinforced joint which has a seamless exterior face. Such a feature is particularly important. The inflatable bladder is intended to be placed inside a tire casing or carcass and must be substantially free of any bumps or roughness on the exterior surface, thereby ensuring an even application of pressure against the inside of the tire casing during the retreading operation.

In order to eliminate the possibility of retaining any unwanted interstitial air within the joint region of the elastomeric material from which the bladder is being made, there is provided a series of blind apertures or bore holes in that channel. These apertures serve as pockets or reservoirs for the reception of air or other gases which may otherwise become trapped within the groove and/or joint region of the elastomeric sheets being bonded together in a vulcanizing operation.

In accordance with one aspect of this invention, therefore, there is provided in a process for making an inflatable bladder in which a pair of disc-like sheets of a vulcanizeable, elastomeric material are placed on opposite sides of an inner mandrel, said sheets each having an outer peripheral edge and being enclosed within a mould in which vulcanization is effected; the improvement comprising, forming a recess with a series of blind apertures therein in the inner mandrel peripherally thereof; and abutting the peripheral edges of said sheets within the recess, whereby upon vulcanization, elastomeric material will flow to fill substantially all of said recess and form a reinforced joint having a radially outwardly extending and seamless surface, while the apertures serve as reservoirs for gasses which otherwise would remain trapped as unwanted interstitial gas within the bonded region of the inflatable bladder.

In another aspect of this invention there is provided in a process for making an inflatable bladder of a vulcanizeable elastomeric material, in which a complementary pair of disc-like sheets of said material are positioned on opposite sides of an inner mandrel with peripheral edges abutting for vulcanization in a sealable mould, the improvement comprising a channel provided in said mandrel, said channel including a series of blind openings therein, and facing radially outwardly and extending circumferentially of the mandrel, whereby a quantity of said material from the abutting edges substantially fills said channel during vulcanization to form a reinforced joint having a seamless outer surface, and interstitial air is received in said openings.

In accordance with another aspect of this invention there is provided an inner mandrel for use in making an inflatable bladder, comprising; a main body section generally circular in plan; said body section including a mounting portion adapted to be supported from a spindle assembly disposed generally centrally of the mandrel; and a peripheral portion, a channel provided on said peripheral portion and disposed to face radially outwardly of said mandrel, and extending circumferentially thereof, said channel including blind openings therein extending into said body section, whereby material from a pair of sheets of vulcanizable, elastomeric material placed on opposite faces of the mandrel with the periphery of said sheets abutting in said channel, will upon vulcanization, fill substantially all of the channel to form a reinforced joint having a seamless exterior on the bladder, and interstitial gasses will be forced into said openings.

Various features and advantages of this invention will become apparent from the following detailed description. That description should be read in conjunction with the accompanying drawings which illustrate by way of example only, one particular form of an inner mandrel of the kind contemplated herein.

DESCRIPTION OF THE PREFERRED EMBODIMENTS

Figure 1:
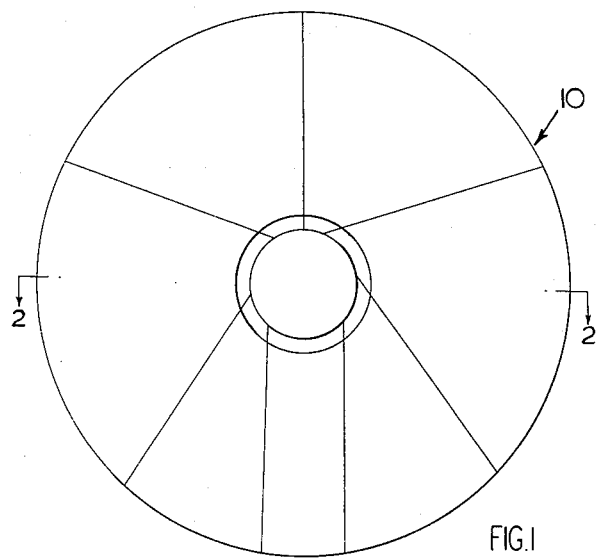
FIG. 1 is a plan view of a preferred form of inner mandrel contemplated by this invention.
Figure 2:
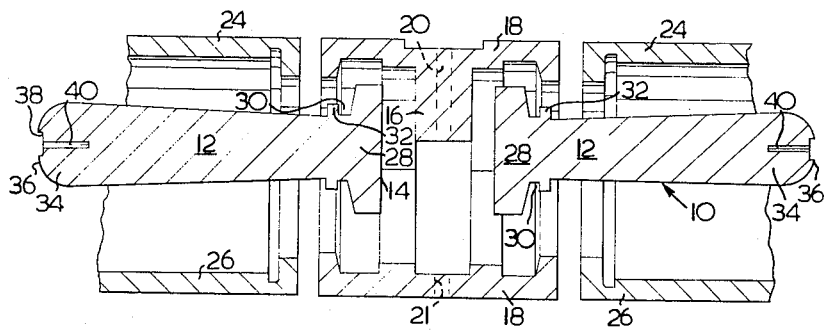
FIG. 2 is a side elevation view taken in section along line 2—2 of FIG. 1, to show structural details of an inner mandrel contemplated by this invention.

Turning now to the drawings FIG. 1 shows an inner mandrel 10 constructed in accordance with one aspect of this invention. The mandrel 10 comprises a main body section 12 made preferrably of solid metal such as aluminium, and includes a central opening 14. This central opening accomodates a spigotted portion 16 of one of a pair of mandrel locking plates 18. The plates 18 are adapted to be bolted together by means of a threaded fastener to receive in a complementary hole 20 and 21. Also associated with the mandrel locking plates 18 are top and bottom sections 24 and 26 of a split mould in which two disc-like sheets of a vulcanizeable, elastomeric material are joined together to make up an inflatable bladder of the kind described earlier.

It will be evident from FIG. 1 that the inner mandrel 10 as well as each of the plates 18 and mould sections 24 and 26 are circular in plan. This will be well known to those knowledgable in the art of manufacturing and retreading of tires.

The inner mandrel 10 is preferrably of the form made up of a plurality of segments which are interlocked and connected one to another along a series of joints shown schematically in FIG. 1. The body section 12 includes a central collar or mounting portion 28 which is thickened in a direction parallel to the axis of the circular mandrel 10. Slightly radially outwardly from the collar portion 28 there is provided on each segment of the mandrel 10 a bead-receiving groove 30. This groove 30 is formed on both opposite faces of the mandrel 10 and is adapted to receive the beaded inner edge of the sheet of elastomeric material from which the material bladder is being made. An axially projecting rib or shoulder 32 defines the radially outer side of the grooves 30. Beyond the shoulders 32 each face of the mandrel 10 is substantially flat, and tapers slightly apart to a maximum amount of separation at a location which can be considered to define a peripheral portion 34 of each segment of the mandrel 10.

Each of the peripheral portions 34 has a radius which joins the axially facing flat surfaces of each face of the mandrel 10 to the peripheral edge 36 of that mandrel. The peripheral edge 36 of the inner mandrel 10 is formed with a relatively shallow groove or channel 38 which extends circumferentially of the mandrel 10. When an inflatable bladder is being formed using the apparatus and method of this invention, the two disc-like sheets of elastomeric material on the faces of the mandrel 10 are placed with their peripheral edges abutting, that abutment occurring generally within the circumferential groove 38. When the mould sections 24 and 26 are closed, and heat and pressure provided within the mould, vulcanization is achieved of the elastomeric material, thus bonding the two sheets together. As vulcanization occurs, some of the elastomeric material from the abutting peripheral edges flows into and substantially fills the circumferential groove 38. In so doing, a thickened and reinforced joint is provided and in particular, that joint has a smooth, seamless exterior surface. As known in this art, the dimensions of the inner mandrel 10 and of the mould plates 24 and 26 can vary, along with the dimensions of the circumferential groove or channel 38. Typically, however, the inner mandrel 10 may have a diameter of 2 feet, with the channel 38 having a width of approximately ⅜ inches and a depth of about 1/32 inches.

In accordance with one aspect of this invention, the circumferentially extending channel 38 is provided with a series of blind apertures or bore holes 40. These apertures or openings 40 are spaced equally apart circumferentially of the mandrel 10, say, every 2 inches. The apertures 40 preferrably are ⅛ inch holes drilled to a depth of approximately ¾ inches, radially inwardly of the body section 12 of the mandrel 10.

The purpose of the blind bore holes or apertures 40 is as follows. Vulcanization to join together the two sheets as an inflatable bladder occurs under heat and pressure. Heat and pressure are frequently obtained by introducing steam under pressure into the closed mould. It is in any event known that considerable care is required to expell and eliminate unwanted interstitial air or other gasses from the elastomeric material being vulcanized. Pressure from within the closed mould will generally force air and gasses from any interstitial spaces of that material, providing those gasses have somewhere to go. In accordance with a preferred form, the blind bore holes or openings 40 are of a selected size sufficient to ensure that substantially all of the interstitial gasses are received in the pocket or reservoir-like apertures 40. The volume enclosed by the apertures 40 is sufficient to prevent the buildup of exessive amounts of pressure within those apertures, so as not to prevent the pressure of vulcanization from expelling virtually all interstitial air from the elastomeric material being vulcanized.

A small buildup of pressure within the apertures 40 is acceptable, and may in some instances be preferred. Such a slight amount of pressure can be used to aid in removal of the reinforced joint portion of the inflatable bladder from the channel 38 when the mould is depressurized after vulcanization. To further assist in removal of that bladder, and more specifically of the thickened joint portion thereof from the channel 38, it may also be useful to provide tapered side walls on that channel, such side walls being spaced closest together at the root of the channel.

It is seen from the forgoing disclosure that a relatively straight forward technique is provided by this invention for minimizing the undesirable effects normally associated with interstitial air or other gasses when elastomeric material is being vulcanized in a process for preparing an inflatable bladder. It is contemplated within the spirit of this invention to encompass all such modifications and changes as would be apparent to those knowledgable in this art, and which fall within the scope of the claims below.

I claim:

1. In a process for making an inflatable bladder, in which a pair of disclike sheets of a vulcanizable, elastomeric material are placed on opposite sides of an inner mandrel with outer edge portions touching said mandrel and said material being enclosed within a mold in which vulcanization is effected, the improvement comprising:

forming a channel with a series of generally radially extending blind apertures extending therefrom, in the periphery of the inner mandrel; and vulcanizing said material while causing some of said material from said layers to flow and substantially fill said channel to form a reinforced joint having a seamless outer surface and also during said vulcanizing receiving unwanted gasses from said layers in said blind apertures whereby unwanted gasses are expelled and eliminated from said material being vulcanized.

2. In the process defined in claim 1, wherein the improvement further comprises forming said apertures of a preselected size sufficient to receive virtually all interstitial gasses from the elastomeric material, said gasses being slightly pressurized in said apertures to aid in removal of the bladder from the inner mandrel when said mould is depressurized after vulcanization.

* * * * *